United States Patent [19]

Knapp

[11] 4,167,855
[45] Sep. 18, 1979

[54] HYDROSTATIC TRANSMISSION CONTROL SYSTEM FOR IMPROVED HILLSIDE OPERATION

[75] Inventor: Kenneth K. Knapp, Spencer, Iowa
[73] Assignee: Eaton Corporation, Cleveland, Ohio
[21] Appl. No.: 907,227
[22] Filed: May 18, 1978
[51] Int. Cl.² .......................................... F16H 39/46
[52] U.S. Cl. ....................................... 60/445; 60/451; 60/465; 60/487
[58] Field of Search ............... 60/445, 447, 449, 452, 60/464, 465, 488, DIG. 2, 451

[56] References Cited

U.S. PATENT DOCUMENTS

| | | | |
|---|---|---|---|
| 3,256,747 | 6/1966 | Kempson | 74/472 |
| 3,606,755 | 9/1971 | Connett | 60/446 |

Primary Examiner—Edgar W. Geoghegan
Attorney, Agent, or Firm—R. J. McCloskey; J. Yakimow; L. Kasper

[57] ABSTRACT

A hydrostatic transmission control system is provided of the type utilizing a main control valve to vary the control pressure being ported to the strokers which control the swashplate position of a variable displacement pump. The control valve includes a control port connected to a source of control pressure fluid and a pair of stroker ports, each of which is connected to one of the strokers. The control valve includes a valve member having a valve land associated with each of the stroker ports, the lands preferably being either zero-lapped or under-lapped and disposed to provide a substantially zero neutral band to provide an improved control response when it is necessary for the valve member to cross the neutral band and port control pressure to the opposite stroker. The control system further includes a positive neutral arrangement wherein movement of the control lever to the neutral setting energizes a valve, preferably a solenoid valve, which interconnects the lines leading from the stroker ports to the stroking cylinders, to insure zero swashplate displacement, despite the use of the zero neutral band control valve.

7 Claims, 8 Drawing Figures

HYDROSTATIC TRANSMISSION CONTROL SYSTEM FOR IMPROVED HILLSIDE OPERATION

BACKGROUND OF THE DISCLOSURE

The present invention relates to control systems for hydrostatic transmission, and more particularly, to such systems which control the fluid pressure in the strokers utilized to control the swashplate position of a variable displacement pump.

Hydrostatic transmission and control systems therefore have become well known in the art. One of the common uses of such systems has been to transmit output torque from the engine of a vehicle into input torque to the vehicle drive wheels. This use of hydrostatic transmission has become especially common on large off-the-road vehicles such as agricultural equipment and, although the control system of the present invention may be advantageously applied to hydrostatic transmissions for a variety of uses, it is especially suited for use with those employed to drive agricultural vehicles, and will be described in connection therewith.

One of the problems associated with the use of hydrostatic transmission systems to drive large agricultural vehicles is that they have been subject to "creeping". This is a phenomenon which occurs when the control lever is placed in the neutral setting to de-swash the variable displacement pump and bring the vehicle to a stop, but, because the control valve does not completely shut off the flow of control pressure fluid to both of the strokers, the swashplate remains slightly displaced, resulting in continued fluid output from the pump and continued movement of the vehicle.

One of the favored solutions to the problem of creeping has been to utilize what is referred to as a "wideband neutral" control spool in which the lands of the valve spool are positioned to block the flow of fluid from the control port to the stroker ports over a range of several degrees of selector position on either side of the neutral setting. The use of wide band neutral control spools has been largely successful in eliminating the problem of vehicle creeping.

Another problem which has arisen in connection with agricultural vehicles utilizing hydrostatic transmissions concerns the use of such vehicles on a sloping terrain where the vehicle alternately goes uphill, then downhill. These vehicles frequently include some type of accessory or agricultural implement, such as a combine, which operates at a given speed and, preferably, the vehicle should move at a nearly constant speed for efficient operation of the implement. However, as the vehicle goes uphill, the increased load on the pump tends to de-swash the pump slightly, thus slowing the vehicle. When the vehicle goes downhill, it tends to overrun the speed of the motor, thus driving the motor as a pump and generating pressurized flow back to the pump to operate the pump as a motor. When this occurs, the pump swashplate is biased toward a greater displacement, such that the stroker which was being actuated by control pressure must now be drained, and the stroker which was being drained must now be pressurized to return the swashplate to its original position. This reversal of stroker pressures requires that the control valve pass through the neutral band to shut off the stroker port which was previously open and open the stroker port which was previously blocked. This reversal of pressure in the strokers counteracts the effect of system pressure tending to increase the swash angle, thus maintaining the swashplate at some new position.

It will be apparent to those skilled in the art that this increase in the swashplate angle as the control valve passes through the neutral band will permit an undesirable increase in speed as the vehicle goes down a slope. It will also be apparent that the amount of undesirable downhill speed-up increases as the amount of neutral band increases. Normally, the above-described reversal would result in movement of the swashplate sufficient to move the control spool a total distance somewhat greater than the dimension of the neutral band. Depending upon the configuration of the follow-up linkage between the swashplate and the valve spool, the total swashplate movement permitted may be the same as the movement of the spool, or as much as several times greater.

Accordingly, it is an object of the present invention to provide a hydrostatic transmission control system which minimizes the amount of control spool travel and swashplate movement during the reversal of stroker pressures associated with the transition from uphill operation to downhill operation.

It is a further object of the present invention to provide a hydrostatic transmission control system which accomplishes the above-stated object without a detrimental effect on the ability of the system to maintain a zero swashplate displacement when the control is in the neutral setting.

SUMMARY OF THE INVENTION

The above and other objects of the invention are accomplished by the provision of a hydrostatic transmission system including a motor unit connected in fluid communication with a pump unit, and fluid operable means for varying the displacement of the swashplate of one of the units in first and second opposite directions. The system further comprises a source of control pressure fluid and main control valve means having a control port in fluid communication with the source of control pressure fluid, the control valve means including first and second stroker ports communicating with the fluid operable means. The main control valve means includes a valve member having a neutral position blocking fluid communication between the control port and the stroker ports, a first control position communicating fluid from the control port to the first stroker port to exert a biasing force on the fluid operable means to move the swashplate in the first direction while draining fluid exerting a biasing force on the fluid operable means tending to move the swashplate in the second direction, and a second control position communicating fluid from the control port to the second stroker port to exert a biasing force on the fluid operable means to move the swashplate in the second direction while draining fluid exerting a biasing force on the fluid operable means tending to move the swashplate in the first direction. Control means is operatively associated with the valve member and has a neutral setting corresponding to the neutral position of the valve member, the control means including followup means for adjusting the position of the valve member in response to movement of the swashplate. The valve member of the main control valve means has a substantially zero neutral band. The system includes neutral valve means selectively operable to permit substantially unrestricted fluid communication between the first stroker port and the second stroker port, and means operable to activate the neutral valve means when the control valve is in the neutral setting and to deactivate the neutral valve means when the control means is moved away from the neutral setting.

DESCRIPTION OF THE PREFERRED EMBODIMENT

Figure 1:
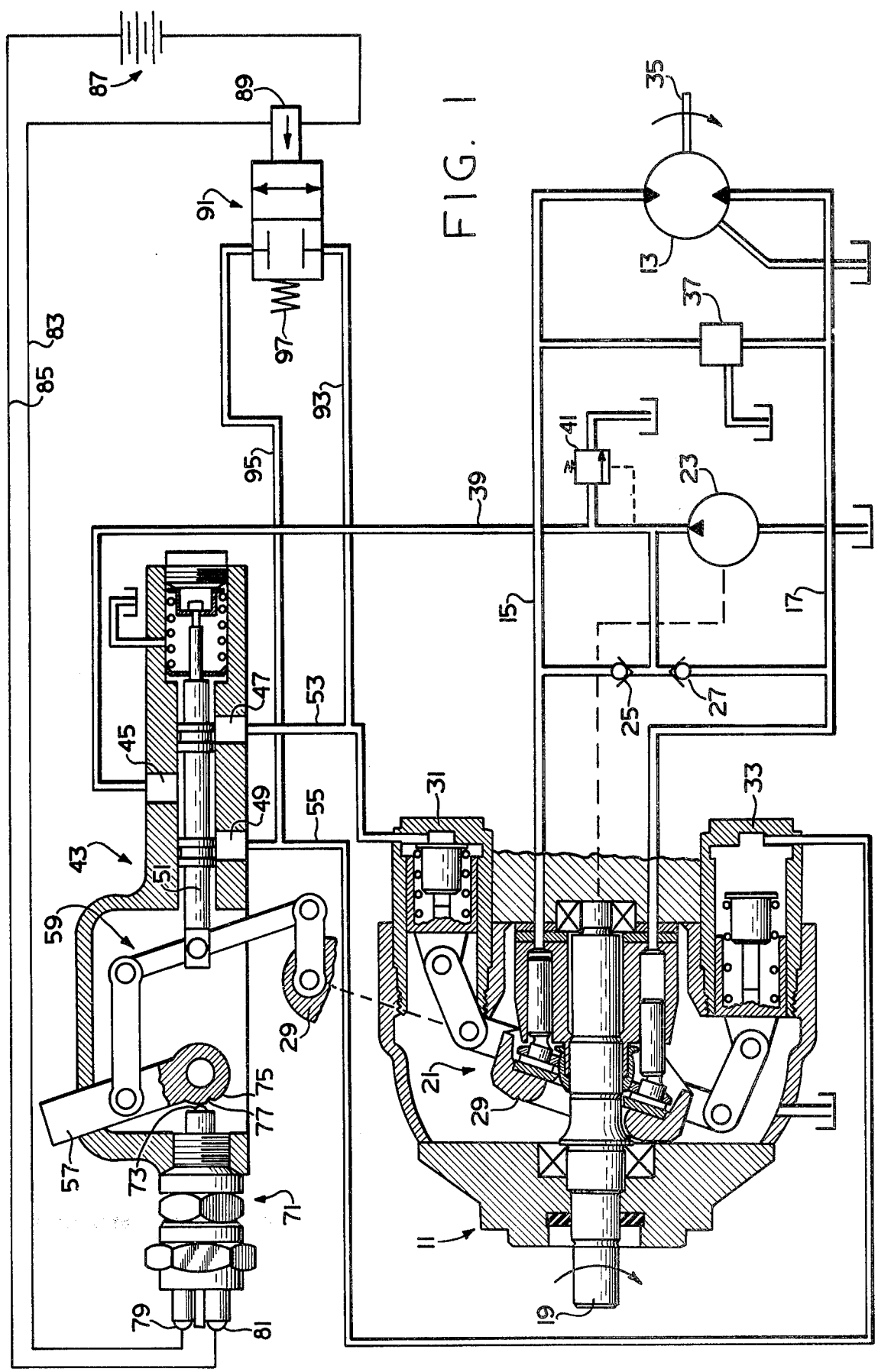
FIG. 1 is an illustration, partly in schematic and partly in cross-section, of a hydrostatic transmission control system in accordance with the present invention.

Referring now to the drawings, which are not intended to limit the invention, the hydrostatic transmission system of FIG. 1 includes a variable displacement axial piston pump, generally designated 11, hydraulically coupled to a fixed displacement motor 13 by means of conduits 15 and 17. Pump 11 may be of a well known type including an input shaft 19 which is used to drive the rotating group, generally designated 21, as well as a charge pump 23, the output of which is capable of providing make-up fluid to either conduit 15 through check valve 25 or conduit 17 through check valve 27, whichever of conduits 15 and 17 is at return pressure.

Pump 11 further includes a swashplate 29 which is movable, to vary the displacement of the pump 11, by a pair of stroking cylinders 31 and 33 of a type well known in the art. The motor 13 includes an output shaft 35, and connected in parallel, hydraulically, with the motor 13 is a known control mechanism 37 which includes a shuttle valve, a high pressure relief valve and a charge pressure relief valve. The output of the charge pump 23, aside from make-up fluid, is communicated by means of a conduit 39 to a control mechanism, to be described subsequently, the conduit 39 also being connected to a charge pump relief valve 41.

The pump 11, the motor 13, the control mechanism 37, the charge pump 23, and the relief valve 41 are all in fluid communication with a fluid reservoir, shown schematically herein as individual reservoirs, but which typically comprises a single reservoir.

The fluid pressures in stroking cylinders 31 and 33, and therefore the displacement of the swashplate 29, are determined by a manually operated control valve, generally designated 43. Control pressure fluid from the charge pump 23 is communicated by the conduit 39 to a control port 45. Control pressure may be directed to either of a pair of stroker ports 47 or 49, depending upon the position of a control valve spool 51. The stroker port 47 is in fluid communication with the stroking cylinder 31 by means of a conduit 53, and the stroker port 49 is in fluid communication with the stroking cylinder 33 by means of a conduit 55. The control valve 43 includes a manually operated control lever 57 and linkage, generally designated 59, connecting the control valve spool 51 with the control lever 57, and with the swashplate 29 to move the spool 51 to its "steady-state" position when the position (angular displacement) of the swashplate 29 corresponds to the setting of the control lever 57, to maintain the swashplate at that position.

Figures 2, 2A:
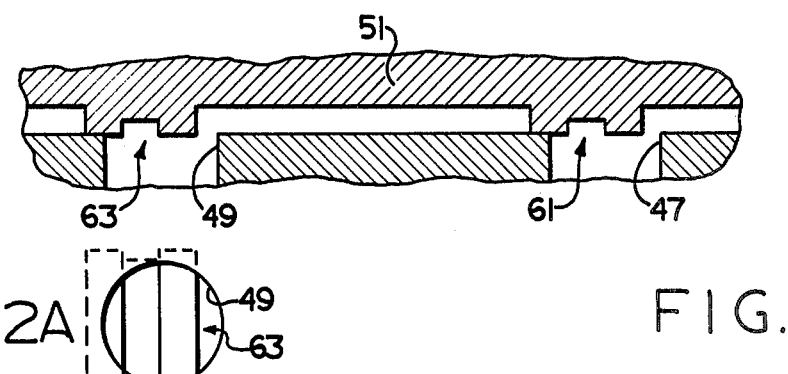
FIG. 2 is an enlarged, fragmentary cross-section of the spool of the control valve illustrated in FIG. 1.
FIG. 2A represents the port and land relationship.

Referring now to FIGS. 2 and 2A, in conjunction with FIG. 1, it may be seen that the valve spool 51 includes a spool land 61, associated with the stroker port 47, and a spool land 63, associated with the stroker port 49. As shown in FIG. 2, each of the lands 61 and 63 comprises two separate lands connected by a portion having a somewhat reduced diameter. However, that aspect of the configuration of spool lands 61 and 63 is irrelevant to the present invention. All of the preceeding elements are generally well known in the art of hydrostatic transmission controls. Accordingly, a further description of the operation of these elements does not appear to be warranted. The remaining portion of the specification will therefore be directed toward a description of the control system of the present invention, introduced by a discussion of the operating situation in which the invention is especially advantageous.

Referring again to FIG. 1, with the manually operated control lever 57 in the position shown, the valve spool 51 is shifted to the left from its neutral position, permitting control pressure fluid to be communicated from the control port 45 to the stroker port 49. Control fluid from the stroker port 49 is communicated through conduit 55 to the stroking cylinder 33 while at the same time, fluid in the stroking cylinder 31 is drained through conduit 53 to stroker port 47, and then to the fluid reservoir. The resulting position of the swashplate 29 is assumed for purposes of this description to be less than the maximum possible displacement.

With the swashplate 29 in the position shown in FIG. 1, high pressure fluid (system pressure) is communicated through conduit 15 to the motor 13, thus transmitting torque to the output shaft 35, propelling the vehicle uphill.

As the vehicle passes over the top of the hill, then begins downhill, and assuming no movement of the control lever 57, it frequently occurs that the vehicle begins to coast and "overrun" the rate of delivery of system pressure to the motor. When this occurs, the motor 13 begins to act as a pump, communicating high pressure fluid through the conduit 17 to the pump 11, which now begins to act as a motor. It must be remembered, in connection with the transition situation just described, that in a variable displacement, axial piston unit acting as a pump, the moments on the swashplate tend to move it toward minimum displacement, whereas, in a unit acting as a motor, the moments on the swashplate tend to move it toward maximum displacement.

Accordingly, upon the above-described reversal, pressurized fluid in conduit 17 is fed to the unit 11, tending to increase the angular displacement of the swashplate 29. As will be understood by those skilled in the art, such an increase in the displacement of the unit 11 is undesirable because it permits an increased rate of fluid flow through the system, and therefore, an increased downhill speed of the vehicle under the overrunning condition. In order to resist this undesirable increase in swashplate angle subsequent to the reversal, it is necessary to reverse the roles of the stroking cylinders 31 and 33, i.e., to pressurize stroker 31 and drain stroker 33. However, such a reversal of stroker pressures can occur only in response to sufficient rightward movement of the control spool 51, such that the land 61 opens communication between the control port 45 and the stroker port 47, while the land 63 blocks communication between the control port 45 and the stroker port 49. This amount of spool travel, and the relationship between spool travel and swashplate movement as determined by the linkage 59, determines the amount of the increase in swashplate angle which will occur, and therefore, the amount of the downhill speedup.

Figures 3, 3A:
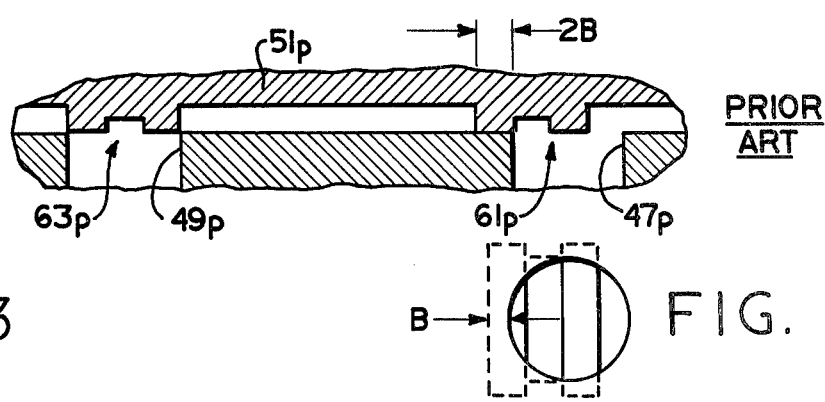
FIG. 3 is an enlarged, fragmentary cross-section of a wide-band neutral spool, in the steady-state position, in accordance with the prior art.
FIG. 3A represents the port and land relationship with the spool in the neutral position.

Referring now to FIGS. 3 and 3A, there is shown a wide-band neutral spool in the position in which it is located during "steady-state" operating conditions, i.e., when the control lever 57 is not being moved, and the swashplate 29 has reached a position corresponding to the setting of the lever 57. In the steady-state position, the land 61p is positioned to completely block communication of control pressure fluid to the stroker port 47p, while leaving the stroker port 47p wide open to drain. At the same time, the land 63p meters the flow of control pressure fluid into the stroker port 49p and meters the flow of fluid from the stroker port 49p to maintain the swashplate 29 at the desired position.

As is shown in FIG. 3A, with the prior art spool in the neutral position, each of the lands 61p and 63p defines a neutral band B, representing the distance through which the spool must travel before control pressure fluid is communicated to the respective stroker port. In a typical commercially available hydrostatic transmission control system, the neutral band B is in the range of about 0.030 inches. However, as may be seen in FIG. 3, with the control spool 51p in the steady-state position, as is the case just prior to the above-described reversal, it is necessary for the spool to travel a distance 2B in order to begin the reversal of the stroker pressures. In the typical hydrostatic transmission control system referred to previously, the spool travel 2B (about 0.060 inches), would represent the actual amount of swashplate movement.

Figures 4, 4A:
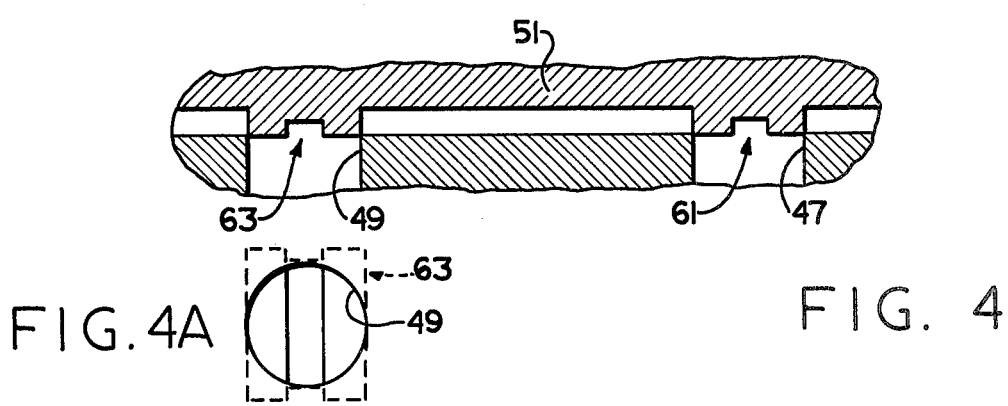
FIG. 4 is an enlarged, fragmentary cross-section of the control spool utilized with the present invention, in the neutral position.
FIG. 4A represents the port and land relationship.

Referring now to FIGS. 4 and 4A, in conjunction with FIG. 1, the improvements of the control system of the present invention will be described. The control spool 51 of the present invention has a substantially zero neutral band, i.e., with the spool in neutral any movement of the spool will cause pressurization of one of the strokers. By "substantially" zero neutral band is meant that the neutral band is zero within reasonable manufacturing tolerances and tolerance stack-ups. It should be apparent from the description of the prior art wide-band neutral spool that with the zero band neutral spool 51, the steady-state position is approximately the same as the neutral position. Thus, the position of the control spool 51 just prior to the reversal of stroker pressures is approximately as shown in FIG. 4, from which it is apparent that the amount of spool travel necessary to initiate the reversal of stroker pressures is nearly zero, such that the amount of increase in swashplate displacement is minimized.

It will be appreciated from viewing FIGS. 4 and 4A that, although a zero neutral band spool minimizes spool travel during reversal of stroker pressures, maintaining the swashplate 29 at a zero displacement with the control lever 57 in its neutral setting is extremely difficult and could be accomplished, if at all, only with extremely precise machining of the lands 61 and 63 and ports 47 and 49. However, referring again to FIG. 1, the present invention includes a positive neutral control which, in conjunction with the zero band neutral spool, provides greatly improved uphill-downhill operation and at the same time, a positive, reliable neutral.

The manually operated control valve 43 includes a switch assembly 71 which is preferably in threaded engagement with the wall of the valve 43. The switch assembly 71 is preferably a normally-open electrical switch, including a plunger 73 which is normally in engagement with a cylindrical surface 75 of the control lever 57. The surface 75 defines a notch 77 positioned such that when the control lever 57 is moved to its neutral setting, the notch 77 receives the plunger 73, permitting it to move to the right in FIG. 1, closing the electrical connection between a pair of contacts 79 nd 81. Connected to the contacts 79 and 81 are electrical connections 83 and 85, respectively, which are connected to the opposite terminals of a source of electrical power 87. In series with the source of power 87 is a solenoid 89 of a neutral valve assembly 91.

In fluid communication with the conduit 53 is a conduit 93, and in fluid communication with the conduit 55 is a conduit 95. Fluid communication between the conduits 93 and 95 is controlled by the neutral valve assembly 91. With the control lever 57 away from the neutral setting, as shown in FIG. 1, the circuit between contacts 79 and 81 is open, the solenoid 89 is deactivated, and a spring 97 biases the neutral valve assembly 91 to the position shown in FIG. 1, blocking communication between the conduits 93 and 95. Thus, the control valve 43 is able to perform its function in the normal manner.

With the control lever 57 in the neutral position, and the circuit between contacts 79 and 81 closed as previously described, the solenoid 89 is activated, overcoming the biasing force of spring 97, and moving the neutral valve assembly 91 to a position (left in FIG. 1) interconnecting the conduits 93 and 95. Therefore, with the manual control lever 57 in the neutral setting, the strokers 31 and 33 are effectively interconnected, thus making certain that the swashplate 29 will move to a position of zero displacement and remain there.

Figure 5:
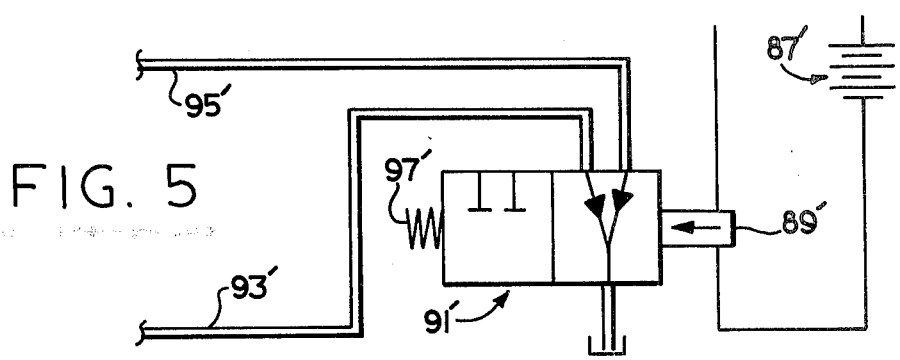
FIG. 5 is a fragmentary view, similar to the schematic of FIG. 1, illustrating an alternative embodiment of the invention.

Referring now to FIG. 5, illustrating one alternative embodiment of the invention, like elements bear like numerals, plus a prime. In this embodiment, the neutral valve assembly 91', rather than interconnecting the conduits 93' and 95' as in FIG. 1, communicate both conduits 93' and 95' to tank in response to activation of solenoid 89', thus effectively insuring that the strokers are at the same pressure, and that the swashplate will move to, and remain at, a zero displacement.

What is claimed is:

1. A hydrostatic transmission including a motor unit connected in fluid communication with a pump unit, and fluid operable means for varying the displacement of the swashplate of one of said units in first and second opposite directions, said hydrostatic transmission further comprising:
   (a) a source of control pressure fluid;
   (b) main control valve means having a control port in fluid communication with said source of control pressure fluid, said control valve means including first and second stroker ports communicating with said fluid operable means;
   (c) said main control valve means including a valve member having a neutral position blocking fluid communication between said control port and said stroker ports, a first control position communicating fluid from said control port to said first stroker port to exert a biasing force on said fluid operable means to move the swashplate in said first direction while draining fluid exerting a biasing force on said fluid operable means tending to move the swashplate in said second direction, and a second control position communicating fluid from said control port to said second stroker port to exert a biasing force on said fluid operable means to move the swashplate in said second direction while draining fluid exerting a biasing force on said fluid operable means tending to move the swashplate in said first direction;

(d) control means operatively associated with said valve member and having a neutral setting corresponding to said neutral position of said valve member, said control means including follow-up means for adjusting the position of said valve member in response to movement of the swashplate;

(e) said valve member of said main control valve means having a substantially zero neutral band;

(f) neutral valve means selectively operable to permit substantially unrestricted fluid communication between said first stroker port and said second stroker port; and (g) means operable to activate said neutral valve means when said control means is in said neutral setting and to deactivate said neutral valve means when said control means is moved away from said neutral setting.

2. A hydrostatic transmission as claimed in claim 1 wherein said one variable displacement unit is of the type wherein forces generated during operation thereof as a pump tend to urge the swashplate to a position of minimum displacement and forces generated during operation thereof as a motor tend to urge the swashplate to a position of maximum displacement.

3. A hydrostatic transmission as claimed in claim 1 wherein said one unit comprises a variable displacement pump of the over-center type.

4. A hydrostatic transmission as claimed in claim 3 wherein said fluid operable means comprises a first stroker mechanism in fluid communication with said first stroker port and operable to move the swashplate in said first direction and a second stroker mechanism in fluid communication with said second stroker port and operable to move the swashplate in said second direction.

5. A hydrostatic transmission as claimed in claim 1 wherein said control port is disposed between said first and second stroker ports and said valve member includes first and second lands associated with said first and second stroker ports, respectively.

6. A hydrostatic transmission as claimed in claim 5 wherein each of said first and second lands has a dimensional relationship with its respective stroker port selected from an underlap and a substantially zero-lap.

7. A hydrostatic transmission system including a motor unit connected in fluid communication with a pump unit, said system being of the type subjected to overrunning loads wherein the motor unit is driven by the overrunning load and generates pressurized fluid which drives the pump unit, said system comprising:

(a) a source of control pressure fluid;

(b) first and second fluid operable means for biasing the swashplate of the pump unit in first and second opposite directions, respectively, in response to said control pressure fluid being present therein;

(c) main control valve means having a control port in fluid communication with said source of control pressure fluid, said control valve means including first and second stroker ports communicating with said first and second fluid operable means, respectively;

(d) said main control valve means including a valve member having a neutral position substantially blocking fluid communication between said control port and said stroker ports, a first control position communicating fluid from said control port to said first stroker port while draining fluid from said second stroker port, and a second control position communicating fluid from said control port to said second stroker port while draining fluid from said first stroker port;

(e) control means operatively associated with said valve member and having a neutral setting corresponding to said neutral position of said valve member, said control means including follow-up means for adjusting the position of said valve member in response to movement of the swashplate;

(f) said control valve means having a substantially zero neutral band;

(g) neutral valve means selectively operable to permit fluid communication between said first stroker port and said second stroker port; and (h) means operable to activate said neutral valve means when said control means is in said neutral setting and to deactivate said neutral valve means when said control means is moved away from said neutral setting.

* * * * *